(12) United States Patent
Gernez

(10) Patent No.: US 7,597,500 B2
(45) Date of Patent: Oct. 6, 2009

(54) ARRANGEMENT FOR ASSEMBLING TWO PARTS BY SCREW-FASTENING USING A SCREW-NUT SYSTEM

(75) Inventor: Alain Gernez, Flagey-Echezeaux (FR)

(73) Assignee: Sidel Participations, Octeville-sur-Mer (FR)

( * ) Notice: Subject to any disclaimer, the term of this patent is extended or adjusted under 35 U.S.C. 154(b) by 0 days.

(21) Appl. No.: 12/158,560

(22) PCT Filed: Dec. 21, 2006

(86) PCT No.: PCT/EP2006/070105

§ 371 (c)(1),
(2), (4) Date: Jun. 20, 2008

(87) PCT Pub. No.: WO2007/071769

PCT Pub. Date: Jun. 28, 2007

(65) Prior Publication Data

US 2008/0304905 A1 Dec. 11, 2008

(30) Foreign Application Priority Data

Dec. 23, 2005 (FR) .................................. 05 54071

(51) Int. Cl.
*B25G 3/36* (2006.01)
*E04G 7/00* (2006.01)

(52) U.S. Cl. .................... 403/403; 403/22; 52/298; 52/704

(58) Field of Classification Search .............. 403/21.22, 403/384, 388, 403, 21, 22; 52/295, 296, 52/298, 704, 708; 108/153.1, 180, 192, 193; 312/158, 257.1, 263, 265.5, 560; 411/103, 411/104, 172
See application file for complete search history.

(56) References Cited

U.S. PATENT DOCUMENTS 4,095,914 A * 6/1978 Thomsen .................... 403/389

(Continued)

FOREIGN PATENT DOCUMENTS

FR 2882727 9/2006

(Continued)

OTHER PUBLICATIONS

Search report in corresponding French Application No. FR 0554071.

*Primary Examiner*—Daniel P Stodola
*Assistant Examiner*—Nahid Amiri
(74) *Attorney, Agent, or Firm*—Young & Thompson

(57) ABSTRACT

An arrangement for assembling two parts by screw-fastening, includes a horizontal flat first part including a housing which extends axially along a screw axis contained in the horizontal plane of the first part and which houses the screw and the nut, at least part of which collaborates with a thrust surface of the housing so as to immobilize the nut axially when a tightening force is applied, and a vertical second part orthogonal to the first part including a first and a second bearing surface which bearing surfaces, in the assembled position, collaborate one of them with a reaction surface of the first part and the other with a clamping surface of the screw whose threaded shank passes through the second part in such a way that part of the screw applies an axial clamping force to the second bearing surface in order to immobilize the first and second parts.

16 Claims, 2 Drawing Sheets

U.S. PATENT DOCUMENTS

| | | | |
|---|---|---|---|
| 5,674,023 A | 10/1997 | Williams et al. | |
| 5,716,154 A * | 2/1998 | Miller et al. | 403/22 |
| 5,902,083 A * | 5/1999 | Hwang | 411/48 |
| 6,196,758 B1 * | 3/2001 | Scarborough | 403/353 |
| 6,367,224 B1 * | 4/2002 | Leek | 52/704 |
| 6,375,923 B1 * | 4/2002 | Duyvesteyn et al. | 423/610 |
| 6,406,235 B1 * | 6/2002 | Bantle | 411/45 |
| 6,540,461 B1 * | 4/2003 | Hawang | 411/48 |
| 7,341,395 B2 * | 3/2008 | Tseng | 403/296 |
| 7,413,367 B2 * | 8/2008 | Hawang | 403/297 |

FOREIGN PATENT DOCUMENTS

| | | |
|---|---|---|
| WO | 8600453 | 1/1986 |
| WO | 2005013840 | 2/2005 |

* cited by examiner ly, of the variant arrange-
ARRANGEMENT FOR ASSEMBLING TWO PARTS BY SCREW-FASTENING USING A SCREW-NUT SYSTEM

FIELD OF INVENTION

The present invention relates to an arrangement for assembling two parts by screw-fastening using a screw-nut system.

BACKGROUND OF THE INVENTION

Many ways of assembling two metal parts together, such as welding, riveting and screw-fastening, are known.

As regards butt assembling a first planar part at right angles to a second part, the known solutions are not completely satisfactory.

The problem is that riveting or welding requires a fixing portion bent into an L shape to form an edge or tabs, this portion being formed for example at the end of the first part and then extending generally parallel to the plane of the second part, notably to allow rivets to be put in the first case or to provide good mechanical strength in the second.

Preparing such a fixing portion on the first part increases its total manufacturing cost and it will also be observed that these two forms of assembly have the disadvantage of not allowing simple, easy disassembly of the two assembled parts, with the result that, depending on the application, a screw-fastened assembly is preferred.

Document U.S. Pat. No. 5,674,023 discloses a butt assembly of a first planar part with the second part using a generally U-shaped hook or "clip" which holds the two parts at right angles to each other.

The U-shaped assembly hook comprises an intermediate portion connected both to an upper portion, whose free end has a hook arm, and to a lower portion forming a base for fixing the hook.

As can be seen in FIGS. 1 and 2 of that document, the hook arm of the hook is designed to pass through the first part, which for this purpose has a hole while the base portion is fixed to the second part by for example a screw extending through the upper and lower portions.

The end of the threaded rod of the screw used to fix the hook to the second part is received in a complementary tapped hole in the second part and the screw head applies an axial clamping force to the upper portion of the hook so that the hook arm engages with a portion of the first part adjacent to the hole.

When, as illustrated in FIG. 3, the second part is so thin that a tapped hole cannot be made, the threaded rod of the fixing screw passes through the second part and is immobilized by means of a nut.

Such a solution does not however give complete satisfaction, partly because of the mechanical strength of such an assembly when the parts are subjected to severe stresses, such as when constructing a machine frame, and partly because of their cost of manufacture.

SUMMARY OF THE INVENTION

It is a particular object of the invention to solve these problems and to provide an arrangement for assembling two parts by screw-fastening capable in particular of butt assembling two parts at right angles to each other, where at least one of the parts is thin, but without necessitating an assembly element such as a hook or clip other than the screw-nut system.

To this end, the invention provides an arrangement for assembling two parts by screw-fastening using a screw-nut system, characterized in that it comprises:

- a first vertical planar part of generally longitudinal orientation comprising a housing that extends axially along a screw-fastening axis in the vertical plane of longitudinal orientation of the first part, in which are accommodated the screw and the nut, of which at least a portion engages with an abutment surface of the housing in such a way as axially to immobilize the nut when a clamping force is applied, and
- a second part of generally transverse orientation, at right angles to the plane of the first part, comprising at least a first bearing surface and a second bearing surface which, in the assembled position, engage respectively with a reaction surface on the first part and with a clamping surface on the screw in which the threaded rod of the screw extends axially through the second part in such a way that a portion of the screw applies an axial clamping force to said second bearing surface to immobilize the first and second parts.

In accordance with other features of the invention:

- the first and second bearing surfaces and the reaction surface and clamping surface each extend generally in a vertical plane of transverse orientation, at right angles to the plane of the first part;
- the abutment surface is at a first or distal axial end of the housing;
- the reaction surface is at the other or proximal axial end of the housing;
- the clamping surface of the screw is the annular surface of the head from which the threaded rod extends;
- the housing comes to an open proximal end in an end of the first part which forms the reaction surface;
- the housing is cut by laser from the first planar part;
- the first and second parts comprise complementary assembly means employing geometrical engagement, such as pins and sockets, in such a way as both to line up and limit the deformation of the parts during clamping;
- the axial clamping force is applied along a screw-fastening axis which lies within the vertical plane of longitudinal orientation of the first part.

BRIEF DESCRIPTION OF THE DRAWINGS

Other features and advantages of the invention will become apparent on reading the following detailed description, for an understanding of which the reader should refer to the accompanying drawings, in which.

DETAILED DESCRIPTION OF THE EMBODIMENTS

By convention, and without implying any limitation, the terms "axial", "proximal" and "distal", and the directions "longitudinal", "vertical" and "transverse" will be used to denote elements in accordance with the definitions given in the description and with reference to the three-dimensional frame of reference (L, V, T) shown in the figures.

In the rest of the description, similar or identical elements will be denoted by the same references.

Figure 1:
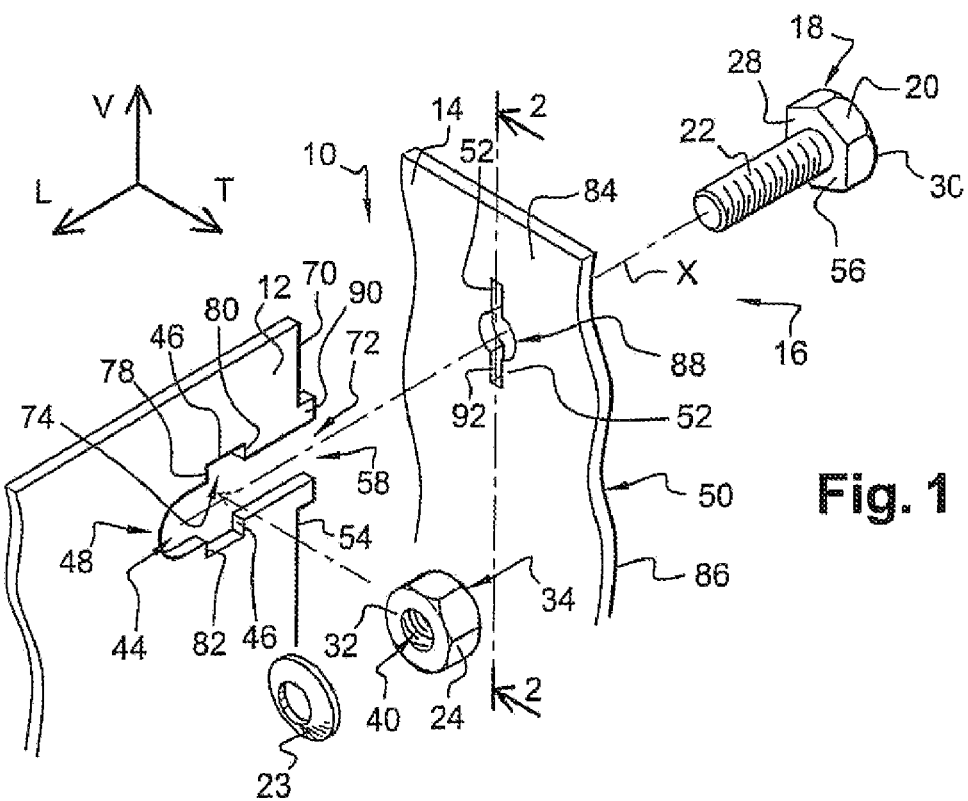
FIG. 1 is an exploded perspective view of an illustrative embodiment of an arrangement according to the invention.
Figure 2:
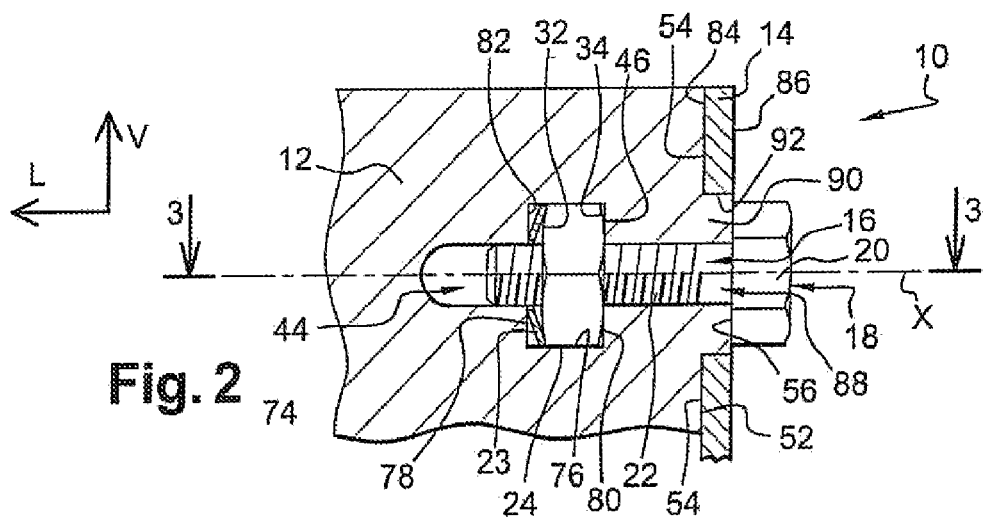
FIGS. 2 and 3 are cross sections, taken on a vertical plane and a horizontal plane, respectively, of the arrangement as shown in FIG. 1 depicted in the assembled position.
Figure 3:
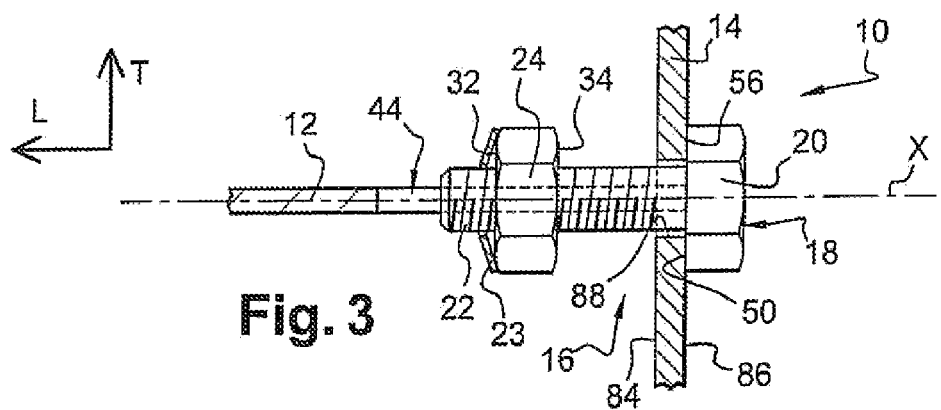

FIGS. 1-3 show an illustrative embodiment of an arrangement 10 for the butt assembling of at least one first piece 12 and one second piece 14 by screw-fastening using a screw-nut system 16.

Using the three-dimensional frame of reference (L, V, T) of FIG. 1, the first part 12 lies vertically along the longitudinal direction and the second part 14 lies vertically along the transverse direction, at right angles to the first part 12.

As in the prior art, the screw-nut system 16 comprises a screw 18 which basically has a head 20 joined to the axial end of a threaded rod 22, and at least one nut 24.

The head 20 of the screw 18 basically has an annular vertical surface 28 from which the threaded rod 22 extends longitudinally, and an unoccupied vertical surface 30 on the opposite side to the rod 22.

By convention, in the following description, an element is said to be "proximal" when it is longitudinally close to the mutually assembled portions of the first and second parts 12 and 14, and "distal" if not.

The nut 24 thus has a distal vertical face 32 and, axially remote from it, a proximal vertical face 34.

The nut 24 has a tapped hole 40, preferably a through hole, that is a hole passing through to the distal vertical face 32, while its internal screw thread fits the external screw thread of the rod 22 of the screw 18.

In the assembled position, the screw 18 and the nut 24 are engaged with each other and assembled along the longitudinal X axis of symmetry of the screw-nut system 16, which corresponds to the screw-fastening axis.

The distal 32 and proximal 34 vertical faces are roughly annular and encircle the hole 40 through which the threaded rod 22 will pass.

The screw-nut fixing system 16 can advantageously be disassembled allowing for example assembly of two parts 12, 14 in a predetermined position, particularly a position in which the first part 12 is arranged at right angles to the second part 14.

Specifically, as shown in FIGS. 2 and 3, the screw-nut system 16 is, when in the assembled position, capable of exerting an axial clamping force in the longitudinal direction to immobilize said first and second parts 12 and 14.

The first part 12 is planar and forms a vertical plate of generally longitudinal orientation, its transverse thickness being much less than the diameter of the threaded rod 22 of the screw 18.

The second part 14 is of generally transverse orientation and is arranged vertically, at right angles to the plane of the first part 12.

According to the invention, the arrangement 10 comprises:
   a first planar part 12 comprising a housing 44 that extends axially along a screw-fastening axis in the plane of the first part 12, in which are accommodated the screw 18 and the nut 24, of which at least a portion 32, 34 engages with an abutment surface 46 of the housing 44 in such a way as axially to immobilize the nut 24 when a clamping force is applied, and
   a second part 14 comprising at least a first bearing surface 50 and a second bearing surface 52 which, in the assembled position, engage respectively with a reaction surface 54 on the first part 12 and with a clamping surface 56 on the screw 18 in which the threaded rod 22 of the screw 18 extends axially through the second part 14 in such a way that a portion 28 of the screw 18 applies an axial clamping force to said second bearing surface 52 to immobilize the first and second parts 12, 14.

The first part 12 comprises a housing 44 that lies longitudinally along a screw-fastening axis in the vertical plane of the first part 12, that is in the L, V plane of the frame of reference depicted in FIG. 1, and in which the screw 18 and nut 24 of the screw-nut system 16 are accommodated in particular.

In the assembled position illustrated in FIG. 2 or 3, at least a portion of the proximal face of the nut 24 engages with an abutment surface 46 of the housing 44 to immobilize the nut 24 axially when the screw-nut system 16 applies a clamping force.

The abutment surface 46 is advantageously located at a first or distal axial end 48 of the housing 44.

The second part 14 has at least a first bearing surface 50 and a second bearing surface 52 which, in the assembled position, engage respectively with a reaction surface 54 on the first part 12 and, directly or indirectly, with a clamping surface 56 on the screw head 20.

The reaction surface 54 is located at another or proximal axial end 58 of the housing 44, that is axially remote from the abutment surface 46.

The distal end 48 of the housing 44 is shaped to present a basically U-shaped perimeter whose dimensions are complementary to those of the threaded rod 22 of the nut 24 which it accommodates.

The housing 44 preferably has nut retention means engaging with a complementary part of the nut 24 so that, before the joint is made, at least the nut 24 can be assembled to the first part 12 to form a unitary subassembly.

The pre-assembled nut 24 is thus advantageously able to be pre-installed in the housing 44 before the first and second parts 12, 14 are assembled together.

The retention means preferably grip the nut 24 or system 16 in such a way as to prevent movement in either or both of the transverse and vertical dimensions and advantageously provide a captive assembly.

The first and second bearing surfaces 50, 52 of the second part 14 therefore consist of portions of surfaces of the distal 84 and proximal 86 transverse faces.

During tightening, the axial length of the screw-nut system decreases in such a way that the more the axial clamping force applied by the clamping surface 56 of the screw head 20 increases, the greater the opposing forces by reaction between the portion of the proximal face 34 of the nut 24 and the abutment surface 46 of the housing 44. This tends to automatically immobilize the nut 24, particularly to prevent rotation about the screw-fastening X axis.

The arrangement 10 has the advantage of being highly compact because the screw-nut system 16 is entirely accommodated in the housing 44. As a result, the volume occupied in the transverse direction is approximately equal to that of the first part 12.

The housing 44 is advantageously made by laser-cutting the first planar part 12, which is a piece of sheet metal with a thickness of between for example 2 mm and 8 mm.

Making the housing 44 and/or the first part 12 by such a cutting method is very simple, quick and inexpensive to carry out.

In one particularly advantageous feature of the arrangement 10, the clamping force applied by the clamping surface 56 of the head 20 of the screw 18 directly or indirectly on the second bearing surface 52 is always perpendicular to the vertical plane of transverse orientation of the second part 14, regardless of the position of the first part 12.

The housing 44 opens at its proximal axial end 58 in an end of the first part 12 which forms the reaction surface 54.

The end of the first part 12 is formed by a vertical edge 70 which determines, depending on the thickness of the first part 12, the vertical reaction surface 54. The vertical edge 70 comprises an axial opening 72 to allow, in the assembled position, axial introduction of the threaded rod 22 of the screw 18 into the housing 44.

The generally elongate housing 44 comprises, axially between the opening 72 and its distal axial end 48, a vertical recess 74 in which the nut 24 is accommodated and which in this case is of a parallelepiped shape complementary to that of the nut 24.

More specifically, the recess 74 has symmetry about the longitudinal screw-fastening X axis and is bounded vertically by an longitudinal edge 76 and longitudinally or axially by a distal vertical edge 78 forming a distal vertical surface 82 and by a proximal vertical edge 80 comprising the abutment surface 46.

The nut 24 is advantageously fixed to the first part 12 so as in particular to allow the parts 12, 14 to be assembled "blind".

The nut 24 is preferably fitted tightly by using a spring washer 23 that can expand longitudinally in the vertical recess 74 of the housing 44 to take up the axial play and thereby immobilize the nut 24 in the recess 74, at least until such time as the parts 12, 14 are assembled together and the rod 22 of the screw 18 is engaged in the nut 24.

The nut 24 is thus immobilized longitudinally between the abutment surface 46 and the distal vertical surface 82.

In a variant, the nut 24 may be immobilized in the recess 74 by any appropriate means, such as for example adhesive bonding or welding.

The second vertical part 14 comprises a distal transverse face 84, a proximal transverse face 86, and an axial hole 88 drilled through both faces 84, 86.

As can be seen in FIGS. 2 and 3, when the parts 12 and 14 are in the assembled position at right angles to each other, the threaded rod 22 of the screw 18 passes through the axial hole 88, then through the opening 72 of the housing 44, and finally into the threaded hole 40 of the nut 24.

The threaded rod 22 of the screw 18 thus extends longitudinally through the second part 14, and the head of the screw 20 bears against the proximal transverse face 86.

The clamping surface 56 is formed by the annular surface 28 of the screw head 20 from which the threaded rod 22 extends. The clamping surface 56 thus engages directly on a part of the proximal transverse face 86 (adjacent to the hole 88) which forms the first bearing surface 50.

In a variant (not shown), a washer is interposed axially between the annular surface 28 of the screw head 20 and the second part 14 so that the clamping surface 56 does not engage directly with the portion of the proximal transverse face 86, particularly to avoid the risk of plastic deformation.

The vertical reaction surface 54 of the vertical edge 70 engages with the second bearing surface 52, which is a part of the distal transverse face 84.

The first and second bearing surfaces 50, 52 and the abutment surface 46, reaction surface 54 and clamping surface 56 each lie approximately in a vertical plane of transverse orientation at right angles to the plane of the first part 12.

The first and second parts 12, 14 preferably comprise complementary assembly means which work by geometrical engagement, similar to a mortise and tenon joint for example.

The complementary assembly means advantageously have a function of positioning the first and second parts 12, 14 in the assembled position, particularly in order to line up the hole 88 with the opening 72 of the housing 44 through which the threaded rod 22 of the screw 18 will pass.

As illustrated in FIGS. 2 and 3, the first part 12 comprises, for example vertically on each side of the opening 72 of the housing 44, a pin 90 which extends axially and is accommodated in a complementary socket 92 formed in the second part 14, in this case contiguously to the hole 88.

The screw head 20 is in this case accessible so that it can be turned by a tightening tool, such as a wrench, in order to clamp the screw-nut system 16.

In the illustrative embodiment, the axial length between the screw head 20 and the nut 24 becomes less as the applied clamping force increases.

The nut 24 is prevented from rotating by two opposite edges which engage with the longitudinal edges 76 defining the vertical sites of the recess 74.

In addition, the nut 24 immobilizes itself axially as soon as a certain clamping force is applied to the screw head 20 because it produces by reaction an interaction with a rising axial force in the opposite direction to the axial clamping force, between a portion of the proximal face 34 of the nut 24 and the abutment surface 46 of the housing 44.

In a variant (not shown), the screw 18 is replaced with an equivalent means such as a threaded rod 22 fitted with another nut forming a "screw head 20" that is advantageously moveable axially along the rod 22 so that the screw-nut system 16 is now the threaded rod 22 and two nuts 20, 24.

For comparison with the illustrative embodiment, the arrangement 10 shown in FIGS. 4-6 will now be described. These figures illustrate an alternative for assembling a first planar part 12' and the second part 14 by screw-fastening using a screw-nut system 16'.

The screw-nut system 16 comprises a screw 18 identical to that described earlier, and a split nut 124.

Figure 4:
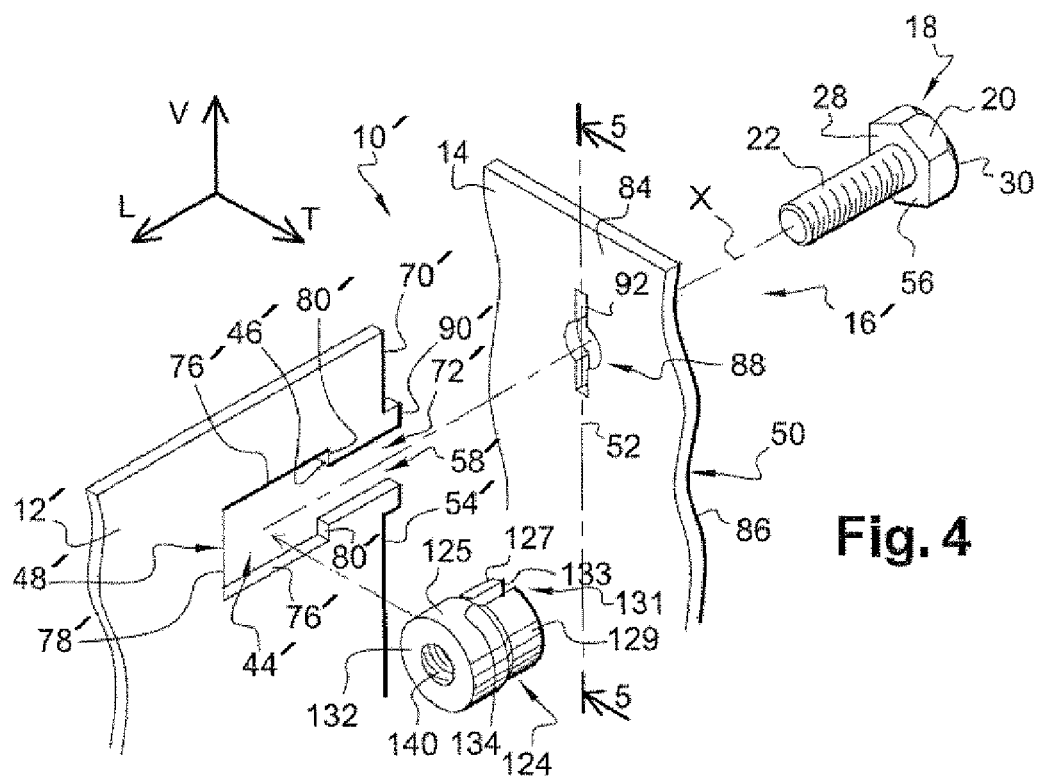
FIG. 4 is an exploded perspective view of a variant of the illustrative embodiment shown in FIG. 1.
Figure 5:
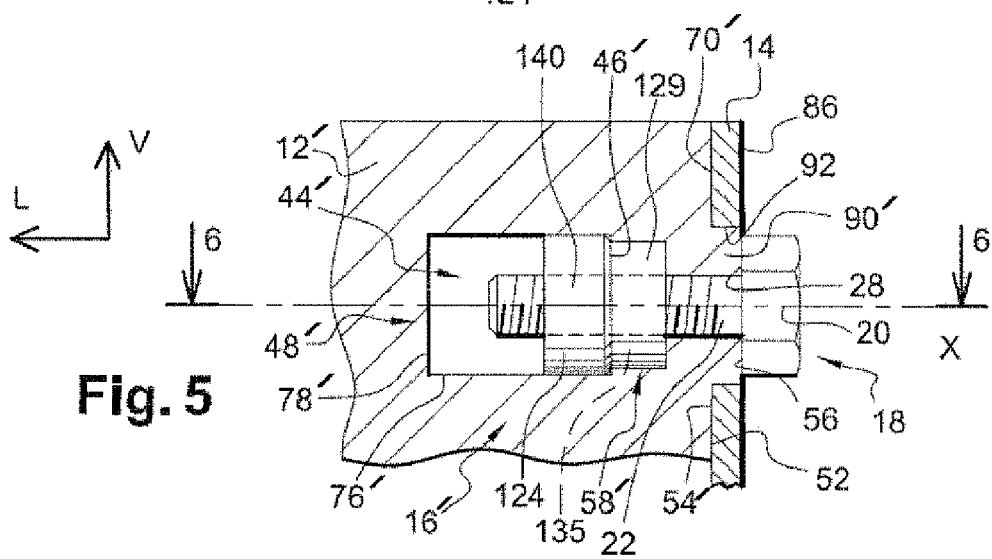
FIGS. 5 and 6 are cross sections, taken on a vertical plane and a horizontal plane, respectively, of the variant arrangement as shown in FIG. 4, depicted in the assembled position.
Figure 6:
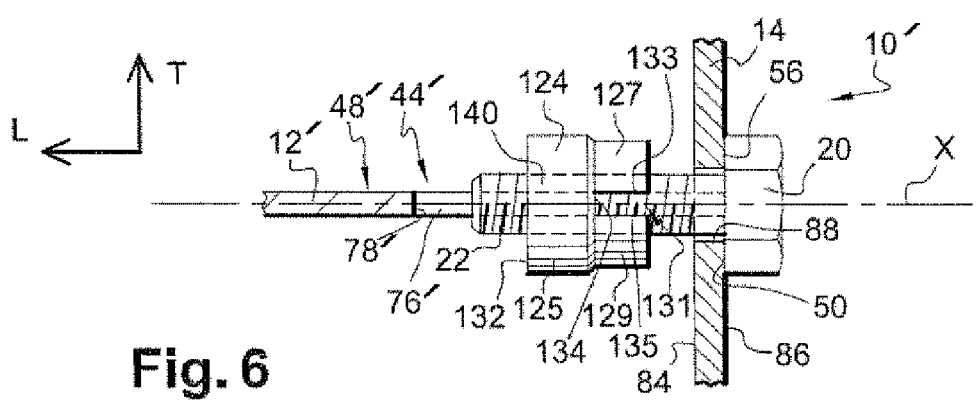

In the alternative embodiment shown in FIGS. 4-6, the nut 124 is a split nut which has the advantage of incorporating the retention means which retain the nut 124 on the first part 12'.

Other advantages of using such a split nut, including preventing the nut rotating once installed in the housing of the first part, will be understood more clearly on reading the following description.

The split nut 124 comprises a body 125 consisting of a distal portion having a distal vertical face 132 and a proximal portion having a vertical slot 131.

The slot 131 extends in longitudinally from the outer cylindrical surface of the body 125 of the nut 124 so that the distal portion of the body 125 is made up of both a first arm 127 and a second arm 129.

The slot 131 is bounded longitudinally by a proximal vertical face 134 forming an end wall, while in the proximal direction it is open axially between the unoccupied proximal end of each arm 127, 129 to allow it to be fitted to the first part 12'.

The split nut 124 comprises a tapped hole 140 extending axially all the way through the body 125, that is from the unoccupied proximal end of the retention arms 127, 129 all the way to the distal vertical face 132.

The first arm 127 has an inner vertical face 133 and the second arm 129 an inner vertical face 135. These inner faces lie laterally on either side of the tapped hole 140.

The transverse distance between the inner faces 133 and 135 is thus equal to a predetermined transverse dimension of the slot 131, or gap, which is advantageously less than or approximately equal to the thickness of the first planar part 12' in the transverse direction.

The tapped hole 140 is complementary to the external screw thread on the rod 22 of the screw 18 with which it engages when the screw 18 and the split nut 124 are assembled on the X axis of the screw-nut system 16' which corresponds to the screw-fastening axis.

The distal vertical face 132 is generally annular and encircles the tapped hole 140 for insertion of the threaded rod 22.

The proximal vertical face 134 and the faces 133, 135 between which the face 134 extends vertically, are preferably planar so that because the face 134 is at right angles to each of the faces 133, 135, the shape of the slot 131, taken in section on a horizontal plane, is generally that of a U lying on its side.

The split nut 124 is preferably inserted axially into the housing 44' until the proximal vertical face 134 meets the vertical abutment face 46', ensuring that the nut 124 is correctly installed.

The inner face 133 of the first upper arm 127 then engages with the adjacent portion of the side face of the first planar part 12', and the opposite inner face 135 of the second arm 129 engages with the adjacent portion of the other side face of the first planar part 12'.

The nut 124 is advantageously force-fitted into the housing 44' in such a way that, because the slot 131 which it comprises is narrower than or equal to the thickness of the first part 12', the arms 127 and 129 "pinch" the part 12'.

The nut 124 is now captive on the first part 12 and prevented from rotating by the retention arms 127, 129 which engage with the first part 12' in such a way that the clamping together of the first and second parts 12', 14 can be achieved simply and rapidly by the sole process of turning the screw 18.

Clearly, if the nut 124 is fitted forcibly, axial immobilization is obtained by the geometrical engagement of the arms 127, 129 of the nut 124 with the first part 12', whether or not the proximal vertical face 134 meets the vertical abutment face 46'.

The slot 131 of the nut 124 extends in the plane of the first part 12', that is to say vertically and in the longitudinal direction.

The lower 133 and upper 135 faces of the retention arms 127, 129 are in this case each vertical.

The first planar part 12' has a housing 44' which differs from the previous illustrative embodiment in that the vertical recess 74' for accommodating the nut 124 extends longitudinally as far as the distal end 48' of the housing 44'.

More precisely, the parallelepiped recess 74' has symmetry about the screw-fastening X axis and is bounded vertically by a longitudinal edge 76' and longitudinally by a distal vertical edge 78' and by a proximal vertical edge 80' comprising the abutment surface 46'.

The nut 124 is installed by first introducing the nut 124 transversely into the recess 74' of the housing and then engaging it with the part 12' by a longitudinal movement from the distal end 48' towards the proximal end 58' of the housing 44' to produce the position shown in FIGS. 5 and 6.

The nut 124 is advantageously and preferably force-fitted onto the thickness of the first part 12' so that the arms 127 and 129 immobilize the nut 124 relative to the first part 12'.

The nut 124 can thus be pre-installed in the transverse recess 74' of the housing 44' in such a way as to be advantageously fastened to the first part 12' and form a subassembly, particularly for "blind" assembling of the parts 12', 14.

Similarly the second vertical part 14 has a distal transverse face 84 and a proximal transverse face 86, with an axial hole 88 drilled through the faces 84, 86.

As can be seen in FIGS. 5 and 6, when the parts 12' and 14 are assembled at right angles to each other, the threaded rod 22 of the screw 18 passes through the axial hole 88, then through the opening 72' of the housing 44', and finally through the tapped hole 140 of the nut 124.

The threaded rod 22 of the screw 18 thus extends axially through the second part 14 and the screw head 20 bears against the proximal transverse face 86.

The clamping surface 56 is formed by the annular surface 28 of the screw head 20 from which the threaded rod 22 extends. The clamping surface 56 thus engages directly with a portion of the proximal transverse face 86 adjacent to the hole 88 forming the first bearing surface 50.

The vertical reaction surface 54' of the vertical edge 70' engages with the second bearing surface 52 which is formed by a portion of the distal transverse face 84.

The first and second bearing surfaces 50, 52, and the abutment surface 46', reaction surface 54' and clamping surface 56 each advantageously extend generally in a vertical plane of transverse orientation at right angles to the plane of the first part 12'.

The first and second parts 12', 14 preferably have complementary means for assembling them together by geometrical engagement, for example by means of pins 90' housed in sockets 92. Said means advantageously help to line the parts up relative to the screw-fastening X axis.

The engagement of the pins 90' of the first part 12' in the sockets 92 of the second part 14 advantageously gives the assembly stiffness, which among other things limits the risk of deformation of the second part 14 when the screw-nut system 16' is tightened up.

The screw head 20 is in this case accessible for tightening with a tightening tool, such as a wrench, in order to tighten up the screw-nut system 16'.

In a variant, the screw head has a hand knob.

When assembled together, the nut 124 is advantageously prevented from rotating by the geometrical engagement of the faces 133, 135 of each of the retention arms 127, 129 with an adjacent portion of each vertical face of the first part 12'.

As with the illustrative embodiment, the axial length between the screw head 20 and the nut 124 decreases as the applied clamping force increases.

The nut 124 therefore tends to immobilize itself axially once a certain clamping force is applied to the screw head 20 because it produces by reaction an engagement having an increasing axial force, in the opposite direction to that of the axial clamping force, between the proximal face 134 of the nut 124 and the abutment surface 46' of the housing 44'.

The invention is not of course limited to the illustrative embodiment and the alternative which have been described and are shown in the figures purely by way of example.

For example, it is possible to reverse the means described, particularly the screw head 20 and the nut 24, so that the axial clamping force is applied by the nut 24.

In a variant, the clamping surface 56 is then formed by either the distal 32 or proximal 34 vertical face of the nut 24 (or indeed another nut) and the portion that engages with the abutment surface 46 is the unoccupied surface 30 or the annular surface 28 of the screw head 20.

The arrangement 10 advantageously comprises means for positioning the first and second parts 12, 14 that are to be assembled together in a predetermined assembly position.

The positioning means (which are not shown) preferably take the form of geometrical engagement between a female element, which may for example be integral with the second part 14, and a complementary male element, which may for example be integral with the first part 12 or with the screw-nut system 16.

Such positioning means advantageously make it possible to immobilize the first and second parts 12, 14 transversely in the assembled position.

The invention claimed is:

1. An assembly of two parts assembled by a screw-nut system, said assembly comprises:
   a first vertical planar part of generally longitudinal orientation comprising a housing that extends axially along a screw-fastening axis in the vertical of longitudinal orientation plane of the first part, said housing comprising a recess defined at a first distal axial end thereof which includes an abutment surface and a reaction surface,
   a second part of generally transverse orientation, at right angles to the plane of the first part, comprising at least a first bearing surface and a second bearing surface,
   said screw-nut system comprising a screw having a clamping surface and a rod, and a nut having a distal face and a proximal face and defining said screw-fastening axis, said nut and at least a threaded end portion of the rod are accommodated in the housing,
   said assembly being configured to immobilize the first and second parts in an assembled position, in said assembled position the rod of the screw extends axially through the second part in such a way that at least a portion of the clamping surface of the screw applies an axial clamping force to the first bearing surface, the reaction surface of the first part engages with the second bearing surface and at least a portion of the proximal face of the nut engages with the abutment surface of the housing of the first planar part to axially immobilize the nut, and said proximal face of said nut being closer to said second bearing surface than said distal face of said nut is to said second bearing surface, said second proximal axial end of said housing being closer to said second bearing surface than said first distal axial end of said housing.

2. The assembly as claimed in claim 1, wherein the first and second bearing surfaces, the reaction surface and clamping surface each extend generally in a vertical plane at right angles to the vertical plane of transverse orientation of the first part.

3. The assembly as claimed in claim 2, wherein the reaction surface is at the other or proximal axial end of the housing.

4. The assembly as claimed in claim 2, wherein the clamping surface of the screw is the annular surface of the head from which the threaded rod extends.

5. The assembly as claimed in claim 2, wherein the housing comes to an open proximal end in an end of the first part which forms the reaction surface.

6. The assembly as claimed in claim 2, wherein the housing is formed from the first planar part using a laser.

7. The assembly as claimed in claim 2, wherein the first and second parts have complementary assembly means employing geometrical engagement in such a way as both to line up and limit the deformation of the parts during clamping.

8. The assembly as claimed in claim 7, wherein the complementary assembly means comprises pins and sockets.

9. The assembly as claimed in claim 2, wherein the axial clamping force is applied along a screw-fastening axis which lies within the vertical plane of longitudinal orientation of the first part.

10. The assembly as claimed in claim 1, wherein the reaction surface is at the other or proximal axial end of the housing.

11. The assembly as claimed in claim 1, wherein the clamping surface of the screw is the annular surface of the head from which the threaded rod extends.

12. The assembly as claimed in claim 1, wherein the housing comes to an open proximal end in an end of the first part which forms the reaction surface.

13. The assembly as claimed in claim 1, wherein the housing is formed from the first planar part using a laser.

14. The assembly as claimed in claim 1, wherein the first and second parts have complementary assembly means employing geometrical engagement in such a way as both to line up and limit the deformation of the parts during clamping.

15. The assembly as claimed in claim 14, wherein the complementary assembly means comprises pins and sockets.

16. The assembly as claimed in claim 1, wherein the axial clamping force is applied along a screw-fastening axis which lies within the vertical plane of longitudinal orientation of the first part.

* * * * *